(12) United States Patent
Jung et al.

(10) Patent No.: US 8,724,568 B2
(45) Date of Patent: May 13, 2014

(54) METHOD OF HANDLING AN UPLINK SYNCHRONIZATION TIMER DURING A HANDOVER IN WIRELESS COMMUNICATION SYSTEM

(75) Inventors: Sung-Hoon Jung, Gyeonggi-Do (KR); Sung-Duck Chun, Gyeonggi-Do (KR); Seung-June Yi, Gyeonggi-Do (KR); Young-Dae Lee, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 13/201,444

(22) PCT Filed: Feb. 26, 2010

(86) PCT No.: PCT/KR2010/001217
§ 371 (c)(1),
(2), (4) Date: Aug. 12, 2011

(87) PCT Pub. No.: WO2010/104279
PCT Pub. Date: Sep. 16, 2010

(65) Prior Publication Data
US 2011/0310845 A1    Dec. 22, 2011

Related U.S. Application Data

(60) Provisional application No. 61/159,803, filed on Mar. 13, 2009, provisional application No. 61/160,678, filed on Mar. 16, 2009.

(30) Foreign Application Priority Data

Feb. 5, 2010 (KR) .......... 10-2010-0011202

(51) Int. Cl.
*H04W 4/00* (2009.01)
(52) U.S. Cl.
USPC .......... 370/329; 370/341; 370/400

(58) Field of Classification Search
CPC .......... H04W 72/042; H04W 56/0045; H04W 72/04; H04W 76/048
See application file for complete search history.

(56) References Cited

U.S. PATENT DOCUMENTS 8,380,196 B2 * 2/2013 Racz et al. .......... 455/436
2006/0040645 A1   2/2006 Grilli et al.

(Continued)

FOREIGN PATENT DOCUMENTS

| CN | 101032136 | 9/2007 |
| EP | 2028900 | 2/2009 |

(Continued)

OTHER PUBLICATIONS

LG Electronics Inc., "Dedicated priority handling at PLMN selection", R2-092345, 3GPP TSG-RAN2 Meeting #65bis, Mar. 2009, XP050340089.

3rd Generation Partnership Project (3GPP); "Technical Specification Group Radio Access Network; Evolved Universal Terrestrial Radio Access (E-UTRA) Radio Resource Control (RRC); Protocol specification (Release 8)", 3GPP TS 36.331, V8.4.0, Dec. 2008, XP050377647.

(Continued)

*Primary Examiner* — Jung Park
(74) *Attorney, Agent, or Firm* — Lee, Hong, Degerman, Kang & Waimey

(57) ABSTRACT

Disclosed is the radio (wireless) communication system providing a radio communication service and the terminal, and more particularly, to a method of handling an uplink synchronization timer during a handover procedure in an Evolved Universal Mobile Telecommunications System (E-UMTS) evolved from the Universal Mobile Telecommunications System (UMTS) or a Long Term Evolution (LTE) system.

5 Claims, 8 Drawing Sheets

(56) References Cited

U.S. PATENT DOCUMENTS

| | | | |
|---|---|---|---|
| 2010/0232382 A1* | 9/2010 | Gauvreau et al. | 370/329 |
| 2011/0002262 A1* | 1/2011 | Wang et al. | 370/328 |
| 2011/0319065 A1* | 12/2011 | Dalsgaard et al. | 455/418 |

FOREIGN PATENT DOCUMENTS

| | | |
|---|---|---|
| KR | 10-0602022 | 7/2006 |
| KR | 1020070005872 | 1/2007 |
| KR | 10-0678147 | 2/2007 |
| WO | 2008/133579 | 11/2008 |

OTHER PUBLICATIONS

United States Patent and Trademark Office U.S. Appl. No. 13/201,444, Office Action dated Aug. 12, 2013, 8 pages.
3rd Generation Partnership Project (3GPP), "Technical Specification Group Radio Access Network; Evolved Universal Terrestrial Radio Access (E-UTRA) Radio Resource Control (RRC); Protocol specification (Release 8)," 3GPP TS 36.331 V8.4.0, Dec. 2008, 12 pages.
State Intellectual Property Office of the People's Republic of China Application U.S. Appl. No. 201080011149.X, Office Action dated Aug. 2, 2013, 8 pages.

* cited by examiner

METHOD OF HANDLING AN UPLINK SYNCHRONIZATION TIMER DURING A HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2010/001217, filed on Feb. 26, 2010, which claims the benefit of earlier filing date and right of priority to Korean Application No. 10-2010-0011202, filed on Feb. 5, 2010, and also claims the benefit of U.S. Provisional Application Ser. Nos. 61/160,678, filed on Mar. 16, 2009, and 61/159,803, filed on Mar. 13, 2009, the contents of all of which are incorporated by reference herein in their entireties.

TECHNICAL FIELD

The present invention relates to a radio (wireless) communication system providing a radio communication service and a terminal, and more particularly, to a method of handling an uplink synchronization timer during a handover procedure in an Evolved Universal Mobile Telecommunications System (E-UMTS) or a Long Term Evolution (LTE) system.

In particular, the present invention provides a improved terminal (UE) operation method for avoiding a handover failure caused by an operation error of the uplink synchronization timer when a network (base station) orders a terminal to perform the handover using a default medium access control (MAC) configuration.

BACKGROUND ART

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Inter-connection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has time duration of 0.5 ms. A Transmission Time Interval (TTI) as a unit time for transmitting data is 1 ms, corresponding to two sub-frames.

Hereinafter, an RRC state and an RRC connection method of UE will be described in detail. The RRC state refers to whether or not the RRC of the UE is logically connected to the RRC of an E-UTRAN. If connected, then it is called an RRC_CONNECTED state, and otherwise it is called an TTC_IDLE state. For the UE in an RRC_CONNECTED state, the E-UTRAN can recognize the existence of the relevant UE in a cell unit because there exists an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the relevant cell. The UE camped in an RRC_IDLE state makes an RRC connection with the RRC of the E-UTRAN through an RRC connection procedure when it is required to make an RRC connection, thereby changing the state to an RRC_CONNECTED state. There are several cases when the UE in an idle state is required to make an RRC connection. For example, an uplink data transmission may be required due to a phone call attempt by the user, or the like, or the transmission of a response message may be required in response to a paging message received from the E-UTRAN.

The Non-Access Stratum (NAS) layer located at an upper level of the RRC performs a function such as session management, mobility management, and the like.

In order to manage the mobility of the UE at the NAS layer, both an EPS Mobility Management-REGISTERED (EMM-REGISTERED) state and an EMM-DEREGISTERED state are defined, and both states will be applied to the UE and a Mobility Management Entity (MME). The UE is initially in an EMM-DEREGISTERED state, and carries out a process of registering it into the relevant network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the relevant location of the UE.

Next, system information will be described. The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

The system information can be divided into MIB, SB, a plurality of SIB, and the like. The Master Information Block (MIB) allows the UE to be notified of a physical architecture of the relevant cell, for example, a bandwidth, and the like. The Scheduling Block (SB) notifies of the transmission information of SIBs, for example, transmission period, and the like. The System Information Block (SIB) is a set of mutually-related system information. For example, a certain SIB includes only the information of neighboring cells, and another certain SIB includes only the information of uplink radio channels used by the UE.

In the related art, if a default MAC configuration (or a default MAC setting) is included in a handover command, an uplink transmission of a terminal (or UE) is not possible performed in a target cell because of the absent of a time alignment timer (TAT) value that will be used in the target cell. This uplink transmission failure will cause a handover failure.

In order to avoid such handover failure, a network must use an explicit MAC configuration (or an explicit MAC setting) instead using of the default MAC configuration. However, if the explicit MAC configuration is used for all handover situations, a size of handover message is significantly increased and this may also cause a transmission failure for the handover message.

DISCLOSURE OF INVENTION

Solution to Problem

Therefore, an object of the present invention is to effectively perform a handover procedure in a wireless communication system.

To achieve this and other advantages and in accordance with the purpose of the present invention, as embodied and broadly described herein, there is provided a method of performing a handover procedure in wireless communications system, the method comprising: receiving a handover command from a network; determining whether a default Medium Access Control (MAC) configuration is included in the received the handover command; receiving an additional information from network if it is determined that the default MAC configuration is included; and performing the handover procedure with the network using the additional information received from the network.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
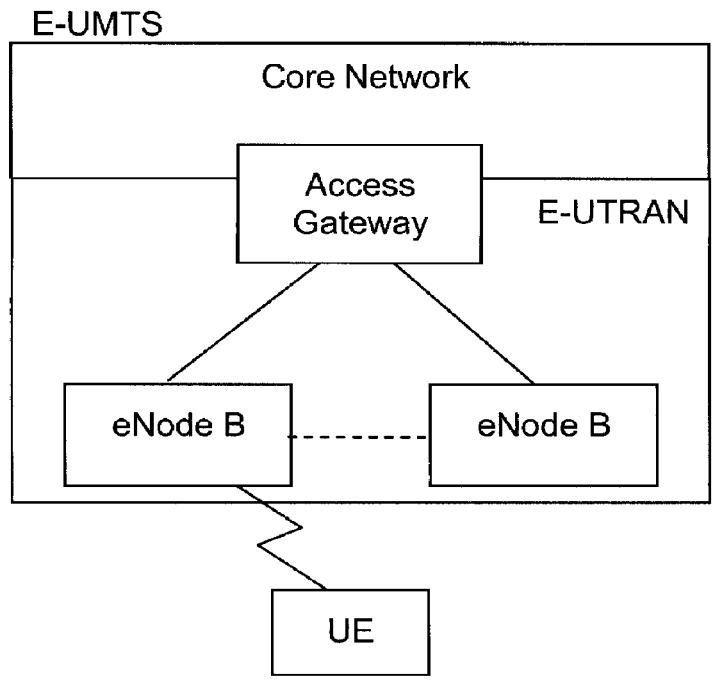
FIG. 1 shows an exemplary network structure of an Evolved Universal Mobile Telecommunications System (E-UMTS) as a mobile communication system to which a related art and the present invention are applied.
Figure 2:
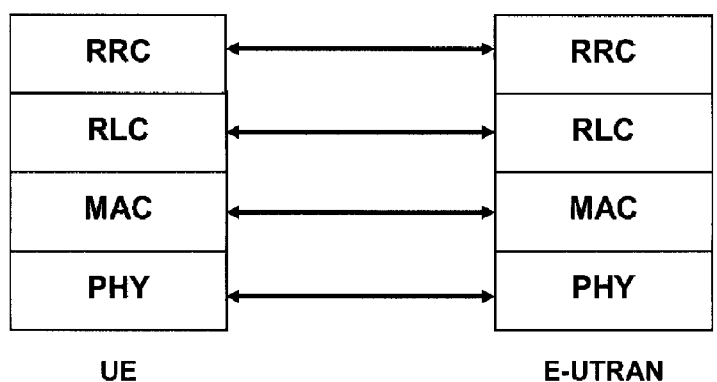
FIG. 2 shows an exemplary view of related art control plane architecture of a radio interface protocol between a terminal and an E-UTRAN.
Figure 3:
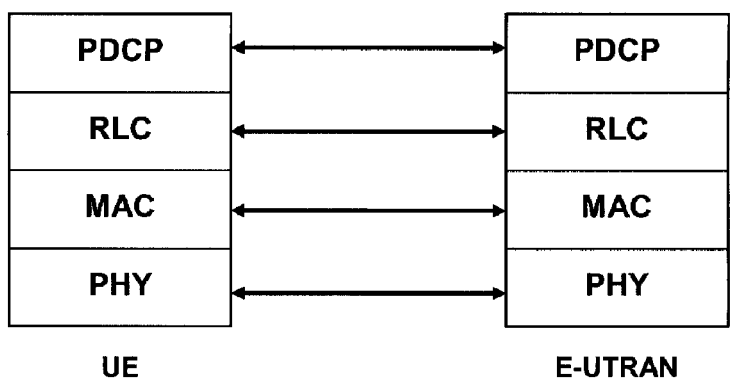
FIG. 3 shows an exemplary view of related art user plane architecture of a radio interface protocol between a terminal and an E-UTRAN.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

According to the present invention, if a network orders a terminal to perform a handover process using a default MAC configuration, the performance of the handover process may be done through a random access procedure after obtaining an additional time alignment timer (TAT) value.

In general, when a network (base station) sets or configures a specific function to a terminal (UE), all necessary parameter value(s) related to the specific function are directly transmitted to the terminal. Thereafter, the terminal may complete a configuration for the specific function by applying the received parameter value(s). Here, this may be called as an explicit configuration.

However, if there is a great amount of parameter(s) that need to be transmitted and if the configuration for the specific function is generated very often, the great amount of radio resource(s) must be allocated for the configuration of the specific function, and this may create a signaling overhead. Therefore, in order to minimize this signaling overhead, a default value for parameter value(s) used in the specific function can be utilized. In other word, instead of transmitting all necessary parameter value(s) to the terminal, the network may order a terminal to use the default value by simply transmitting a specific command. Upon receiving the specific command, the terminal may complete the configuration for the specific function by using of the default value. And, this may be called as a default configuration.

In general, a mobility support for the terminal is a necessity factor in wireless communication system. In order to support the mobility of the terminal, the terminal may continuously measure a quality of serving cell providing a current service. The terminal may also measure a quality of neighboring cell. Then, the terminal may transmit the measurement result to a network in a appreciate time period, and the network may provide an optimized mobility for the terminal based on the received measurement result. Here, information related to the optimized mobility for the terminal can be transmitted to the terminal through a handover command.

In addition to support the mobility of the terminal, a special measurement procedure may be set to be performed by a terminal such that a network service provider can obtain any beneficial information for a network operation. For example, the terminal may receive broadcast information of a particular cell assigned by the network, and then the terminal may check identity information (e.g., Global Cell Identity; GCI) of the cell, position identity information (e.g., Tracking Area Code) of the cell, and/other cell information (e.g., member or non-member of CSG (Closed Subscriber Group) cell). Thereafter, the terminal may report this information to a serving cell. Or, during a movement of the terminal, if service qualities of certain cells are measured as very bad, area information and measurement results for those bad cells may be transmitted to the network for its optimization.

In general, if a frequency reuse factor is 1 in wireless communication system, a terminal is moved between different cells within same frequency. Therefore, in order to support a mobility of the terminal, the terminal has to easily find those cells using same center frequency that of the serving cell. Further, the terminal has to well measure a quality and cell information for those cells. A measurement for a cell using a center frequency that is equal to the center frequency of the serving cell may be called as an intra-frequency measurement. In some case, the terminal may perform this intra-frequency measurement, and may repot the intra-frequency measurement result to the network.

The mobile communication provider may utilize a network by using different frequencies. In case that a mobile communication service is provided using the different frequencies, in order to guarantee a mobility of the terminal, cells in different frequency should be also detected by the terminal. Further, the terminal may also need to measure a quality and cell information for those cells in different frequency. A measurement for a cell using a center frequency that is different from the center frequency of the serving cell may be called as inter-frequency measurement. In some case, the terminal may perform this inter-frequency measurement, and may repot the inter-frequency measurement result to the network.

Further, if the terminal supports a measurement for a mobile communication network, a measurement for a cell of the mobile communication network may be performed by a base station's setting. This measurement for the mobile communication network may be called as inter-RAT measurement.

Figure 4:
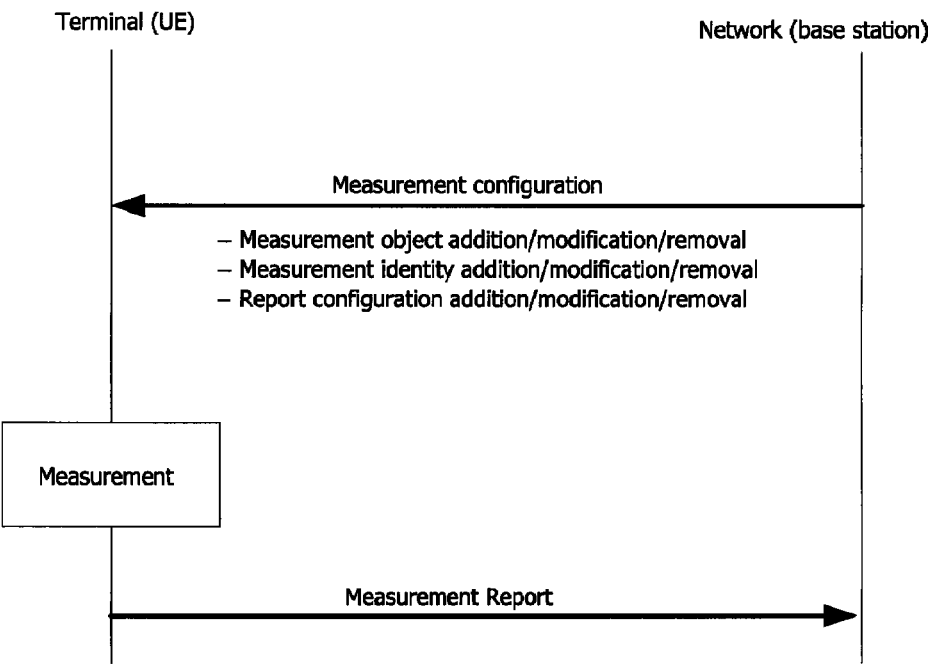
FIG. 4 is an exemplary view illustrating a measurement report procedure.

FIG. 4 is an exemplary view illustrating a measurement report procedure.

As illustrated in FIG. 4, the terminal may determine a measurement object according to a measurement configuration set by a base station, and then may report a measurement result to the base station. Thus, if the terminal receives a measurement configuration message (or any message that corresponds to the measurement configuration message), the terminal may perform the measurement based on the measurement configuration message. Thereafter, if a measurement result satisfies a measurement result report condition included in the measurement configuration message, the terminal may transmit the measurement result via a measurement report (MR) (or any message that corresponds to the MR). Here, the measurement configuration may include following parameters.

Measurement object: parameter indicating what object should be measured by the terminal. Usually, the measurement object that should be measured by the terminal is one of an intra-frequency measurement object, an inter-frequency measurement object, and an inter-RAT measurement object.

Reporting configuration: parameter indicating a measurement result reporting format and a time (or condition, case) for a transmission of the measurement result report message (i.e., report trigger time, report trigger condition, report trigger cases, etc).

Measurement identity: parameter indicating a type of reporting format and a time to report the measurement result report message with respect to which measurement object. The measurement identities connect the measurement object and the reporting configuration. The measurement identity may be included in the measurement result report message such that a measurement object and a type or time of report trigger can be identified by the measurement result report message itself.

Quantity configuration: parameter indicating a measurement unit, report unit setting, or a filter value for filtering of the measurement result value, etc.

Measurement gap: parameter indicating a time only used for measurement. This measurement gap is created because scheduling for a downlink transmission or an uplink transmission is not established. During this time, there is no data transmission between the terminal and serving cell.

In order to perform the measurement procedure explained above, the terminal may have a measurement object list, measurement reporting configuration list, and a measurement identity list. In general, E-UTRAN base station may configure only one measurement object to the terminal for a single frequency.

Figure 5:
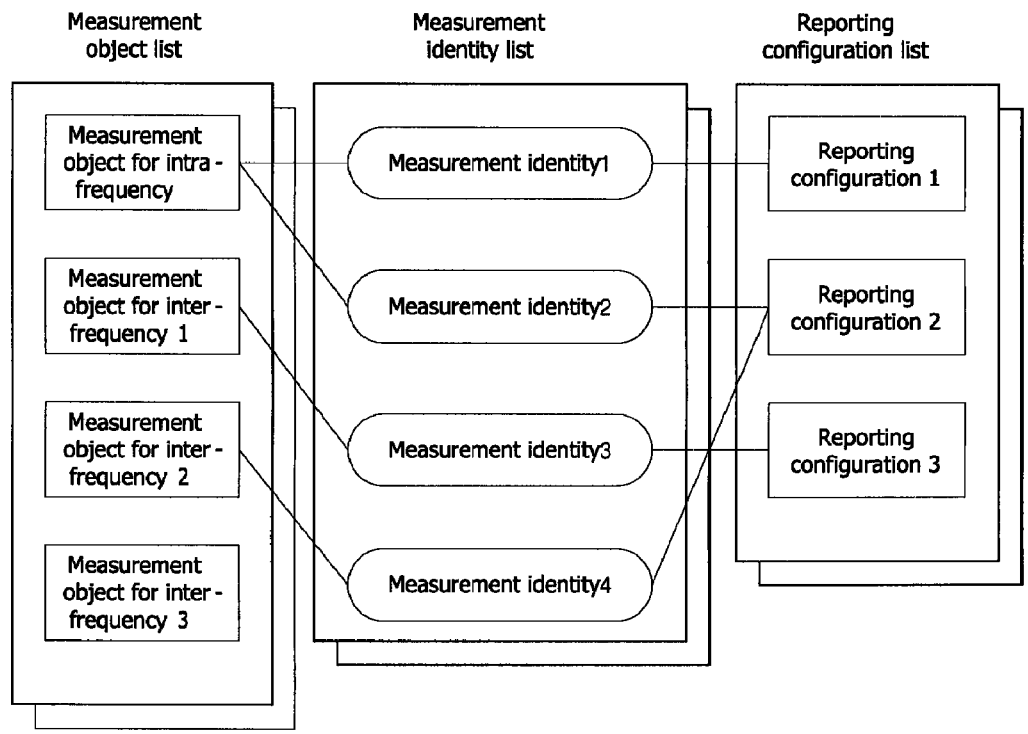
FIG. 5 is an exemplary view for a measurement configuration used in the measurement report procedure.

FIG. 5 is an exemplary view for a measurement configuration used in the measurement report procedure.

As shown in FIG. 5, a measurement identity 1 connects a measurement object for intra-frequency with a reporting configuration 1. Accordingly, the terminal may perform a measurement for intra-frequency, and the reporting configuration 1 is used to determine a measurement result report format and a time/condition for the measurement result report.

Just like the measurement identity 1, a measurement identity 2 is connected with the measurement object for intra-frequency. However, unlike the measurement identity 1, a reporting configuration 2 is connected with the measurement identity 2. Accordingly, the terminal may perform the measurement for intra-frequency, and the reporting configuration 2 is used to determine a measurement result report format and a time/condition for the measurement result report. Since the reporting configuration 1 and reporting configuration 2 are respectively connected to the measurement object for intra-frequency via the measurement identity 1 and 2, if a measurement result for the intra-frequency measurement object satisfies any one of the reporting configuration 1 and the reporting configuration 2, the terminal can report the measurement result for the intra-frequency to a network.

A measurement identity 3 connects a measurement object for inter-frequency 1 and a reporting configuration 3. Accordingly, if a measurement result for the inter-frequency 1 satisfies a result report condition (or requirement) included in the reporting configuration 3, the terminal can report the measurement result for the inter-frequency 1 to the network.

A measurement identity 4 connects a measurement object for inter-frequency 2 and a reporting configuration 2. Accordingly, if a measurement result for the inter-frequency 2 satisfies a result report condition (or requirement) included in the reporting configuration 2, the terminal can report the measurement result for the inter-frequency 2 to the network.

Here, the addition/modification/removal of the measurement object may be made by a network (base station). Furthermore, the addition/modification/removal of the measurement identity may be made by the network. Also, the addition/modification/removal of the measurement report configuration may be made by the network.

Figure 6:
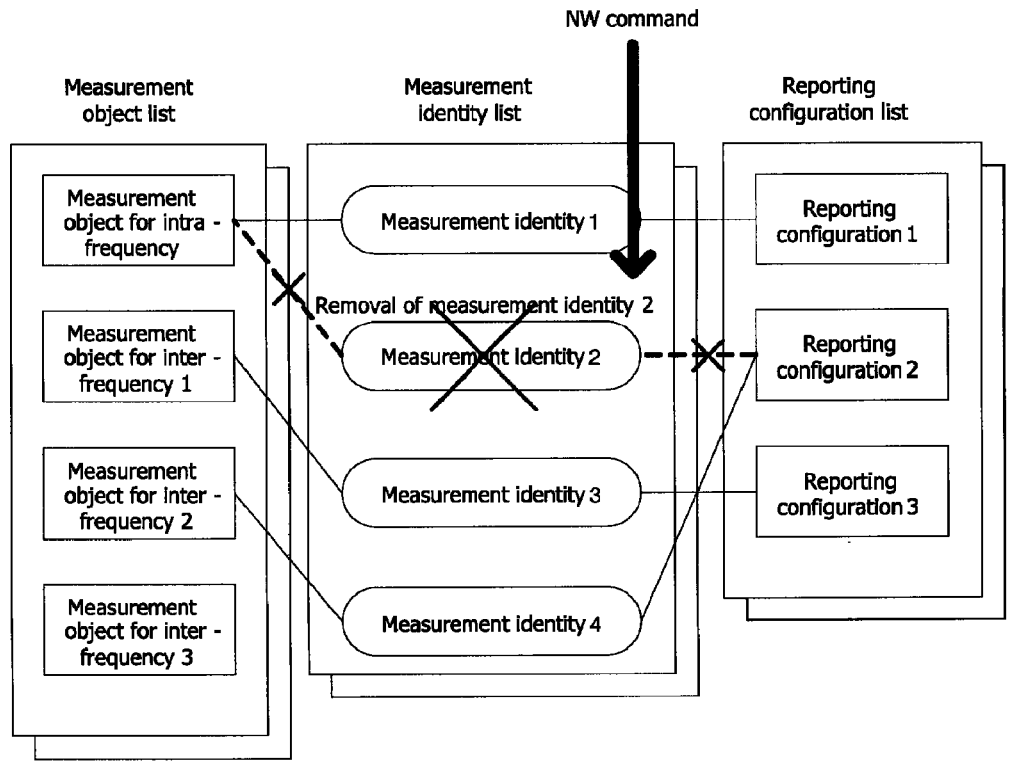
FIG. 6 is an exemplary view of an operation of deleting a measurement identity in the measurement configuration.

FIG. 6 is an exemplary view of an operation of deleting a measurement identity in the measurement configuration.

As illustrated in FIG. 6, if a network (base station) deletes a specific measurement identity (e.g., measurement identity 2) through a network command, a terminal may stop to perform a measurement associated with the specific measurement identity. Further, any measurement report for a measurement result related to the specific measurement identity may be stopped. Here, although the specific measurement identity has been deleted, associated measurement object and reporting configuration are not removed or not modified.

Figure 7:
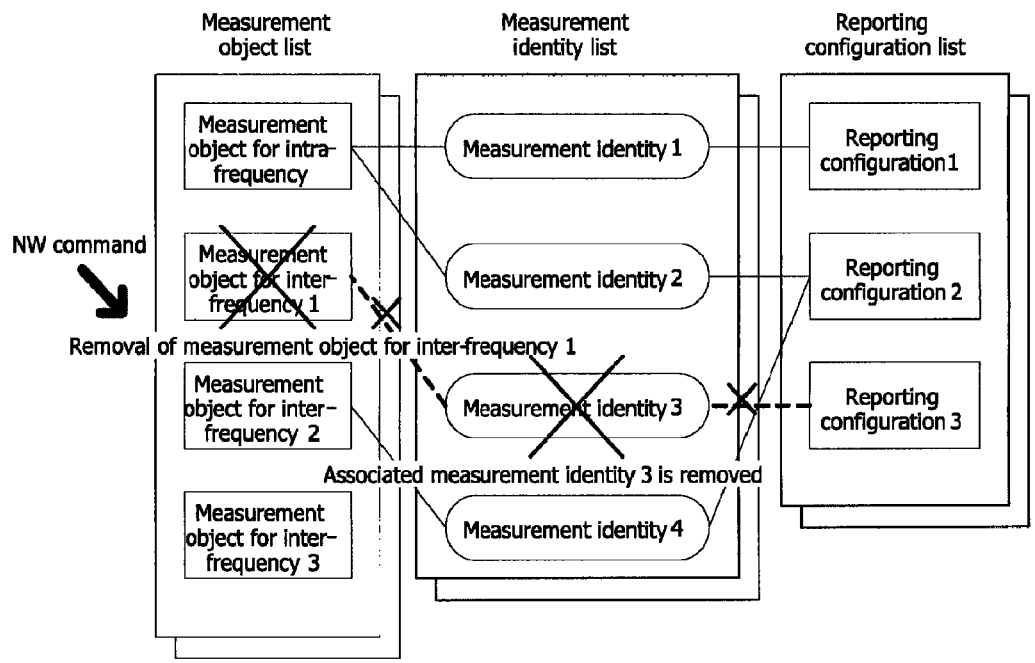
FIG. 7 is an exemplary view of an operation of deleting a measurement object in the measurement configuration.

FIG. 7 is an exemplary view of an operation of deleting a measurement object in the measurement configuration.

As illustrated in FIG. 7, if a network (base station) deletes a specific measurement object (e.g., measurement object for inter-frequency 1) through a network command, a terminal may stop to perform a measurement associated with the specific measurement object. Further, any measurement report for a measurement result related to the specific measurement object may be stopped. Here, although the specific measurement object has been deleted, an associated reporting configuration is not removed or not modified.

Although it is not illustrated by a figure, if a network (base station) deletes a specific measurement report configuration through a network command, a terminal may also delete an associated measurement identity. Further, a terminal may stop to perform a measurement associated with the deleted measurement identity. Further, any measurement report for a measurement result related to the deleted measurement identity may be stopped. Here, although the specific measurement report configuration and the associated measurement identity have been deleted, an associated measurement object is not removed or not modified.

Figure 8:
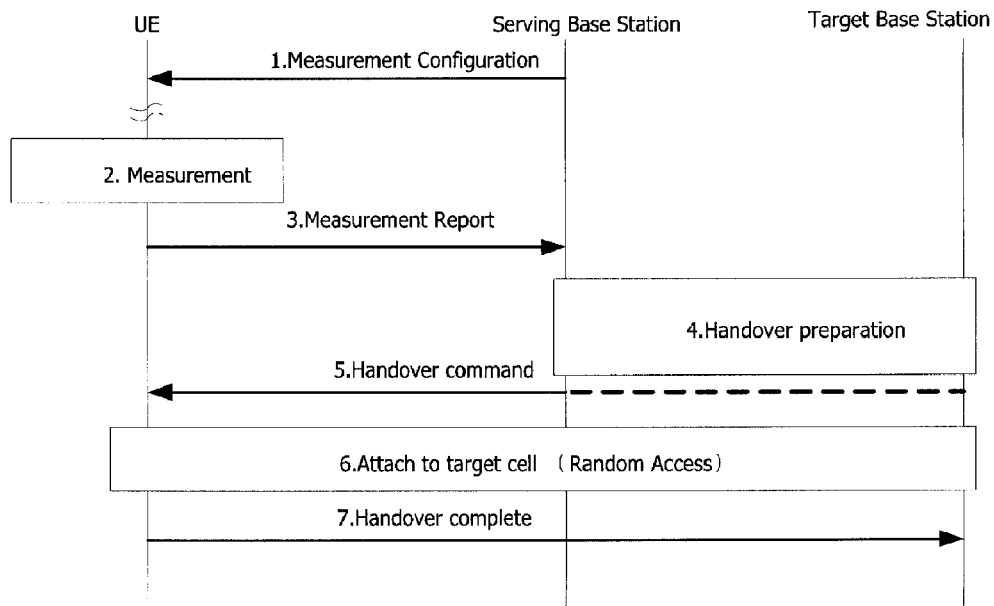
FIG. 8 is an exemplary view of signaling flow between a terminal and a network during a handover.

FIG. 8 is an exemplary view of signaling flow between a terminal and a network during a handover.

In general, a handover procedure is performed to support a mobility of a terminal that is in a RRC connected state. Namely, a continuity of the service must be maintained even when the terminal moves in a wireless communication system. Further, a quality of the service also has to be maintained at its highest degree. Here, a procedure for a movement of the RRC connected terminal from a currently access cell to a new cell is called as a handover.

As illustrated in FIG. 8, a network (base station) may transmit a measurement configuration to a RRC connected terminal (UE) for a mobility maintenance/management of the terminal. (Step 1) Thereafter, the terminal may perform a measurement based on the received measurement configuration. (Step 2) If a measurement result satisfies a measurement result report condition included in the measurement configuration, the terminal may report the measurement result to the network (i.e., current serving base station). (Step 3) Thereafter, the serving base station and a target base station may determine whether to perform the handover based on the measurement result. If the network (i.e., serving and target base stations) decides to perform the handover, the target base station may allocate radio resource(s) to provide a service to the terminal, and this can be called as a handover preparation. (Step 4) After the handover preparation, the target base station may transmit a handover command to the terminal through the serving base station. (Step 5) After receiving of the handover command, the terminal may attempts to access into the target base station (or attach to the target cell) through a random access procedure. (Step 6) Lastly, if the access into the target cell is successful, the terminal may transmit a handover complete message to the target cell, thereby completing of the handover procedure.

In general, the handover is performed when a quality of serving cell becomes bad. Therefore, if the handover procedure is required, it must be performed in urgent manner. If a transmission of the terminal's measurement result is delayed or if a transmission of the handover command is delayed due to a network problem, a communication between the terminal and network may become disconnected. As such, a time criticality of the handover may affect on a design of the handover procedure. For example, in order to minimize a total time for completing all handover procedure, the terminal may not read broadcast information of the target cell during the handover procedure. Rather, the broadcast information of the target cell may be read by the terminal after completion of the handover.

Here, the handover command (i.e., handover message) may include the following contents; 1) Target cell identification, 2) Target cell access information (e.g., bandwidth, center frequency, etc), 3) MAC configuration, 4) RLC configuration, 5) PDCP configuration, 6) UE identity, 7) Security configuration, 8) Measurement configuration.

In general, the handover message (or handover command) must include all necessary configuration(s) for performing an operation of the terminal in the target cell. However, since all necessary configurations(s) are included in the handover message, a size of the handover message may become too large, and this may cause a handover delay or a handover failure. Accordingly, if the size of handover message is relatively large, the network may use a default configuration (or setting) in order to minimize the size of the handover message.

Figure 9:
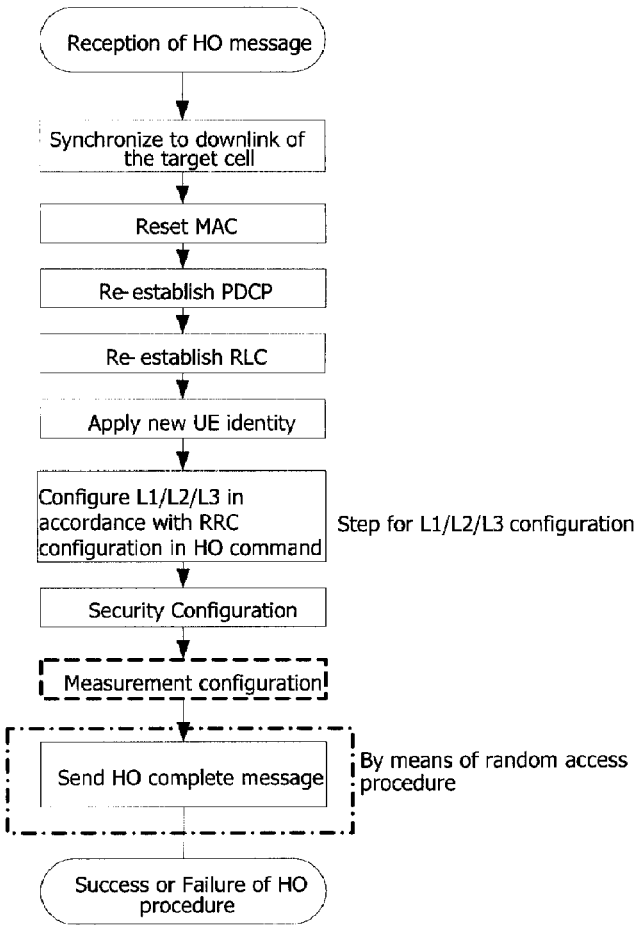
FIG. 9 is an exemplary view illustrating a handover procedure after receiving a handover message by the terminal.

FIG. 9 is an exemplary view illustrating a handover procedure after receiving a handover message by the terminal.

As illustrated in FIG. 9, after a reception of the handover message, the terminal may start to synchronize with the target cell. Thereafter, the terminal may reset a medium access control (MAC) entity. Further, the terminal may re-establish a packet data convergence protocol (PDCP) entity and a radio link control (RLC) entity. After reestablishing the PDCP entity and the RLC entity, the terminal may apply new user equipment (UE) identity. Thereafter, the terminal may set or configure lower layers (L1/L2/L3) accordance with a radio resource control (RRC) configuration included in the handover message. Thereafter, the terminal may configure a security and a measurement, and then may try to access into the target cell (i.e., transmitting a handover complete message) by means of a random access procedure. Here, the handover procedure may be either successful or unsuccessful.

A description for uplink and downlink synchronizations between a terminal (UE) and a network (base station) will be given as following.

In order to maintain a communication link with the network, the terminal must align uplink/downlink synchronizations with the network. If the uplink/downlink synchronizations are not aligned, the terminal may not receive data transmitted through the downlink, and may not transmit data to the network through the uplink. Here, the network may continuously provide feedback information related to the uplink synchronization to the terminal such that the terminal can adjust the uplink synchronization. The feedback information may represent a time gap or time difference indicating a uplink synchronization between the terminal and the network. As mentioned above, the terminal may perform an adjustment for the uplink synchronization using the received feedback information from the network. In general, after receiving the feedback information from the network, if the terminal does not receive the feedback information again for a certain period of time, the terminal determines that the uplink synchronization is not properly aligned. To do this determination, once the terminal receives the feedback information from the network, the terminal starts to run a specific timer. This specific timer is called as a timer alignment timer (TAT) in LTE system. Here, the terminal may receive a TAT value for operating the TAT from the network, and the TAT value may be received through a dedicated signaling or a broadcast signaling transmitted from the network.

After reception of the handover command, the terminal usually reset a MAC configuration (or a MAC setting). Here, the resetting of the MAC configuration further includes a reset of the TAT. Thereafter, the terminal may attempt to access to the target cell in accordance with the MAC configuration included in the handover command. Here, the MAC configuration may be divided into an explicit MAC configuration and a default MAC configuration.

Figure 10:
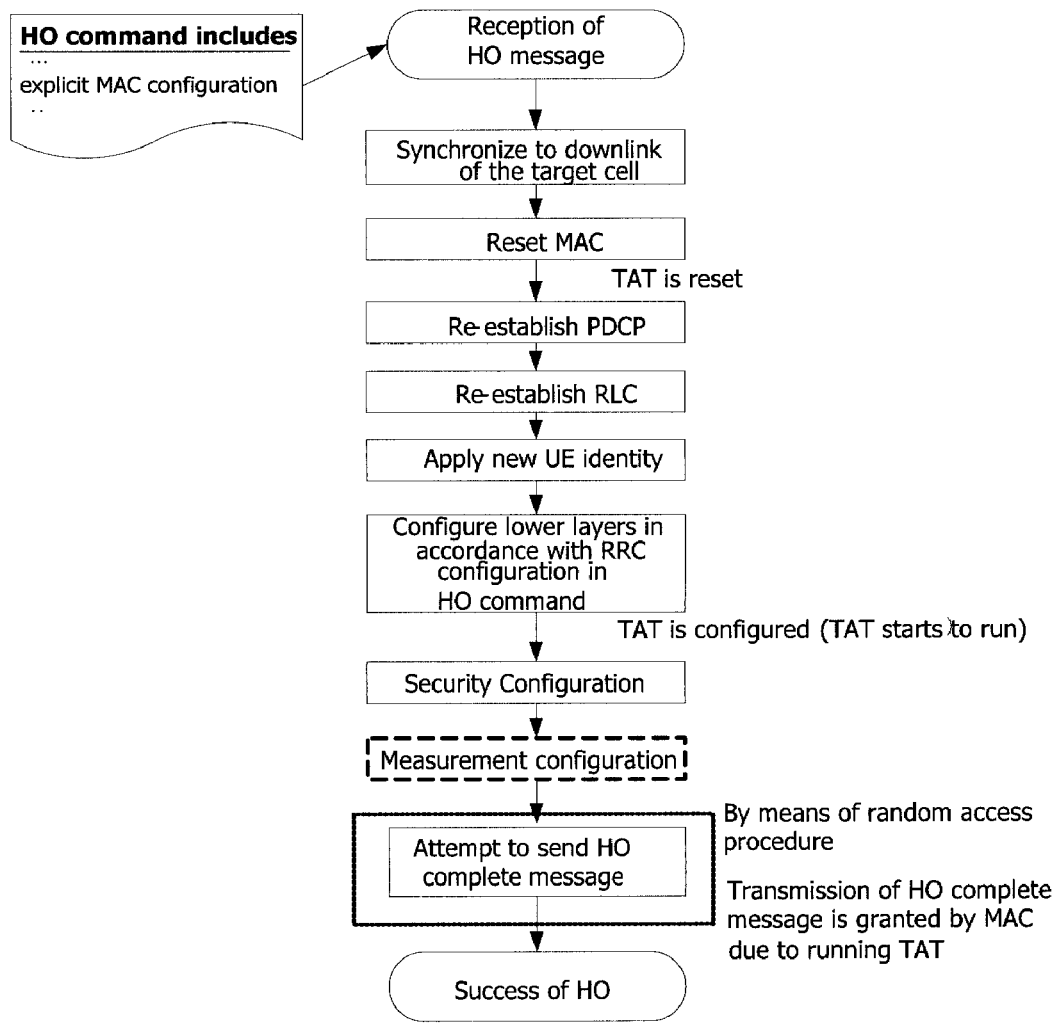
FIG. 10 is an exemplary view illustrating a handover procedure after a terminal receives a handover message including an explicit MAC configuration.

FIG. 10 is an exemplary view illustrating a handover procedure after a terminal receives a handover message including an explicit MAC configuration.

As illustrated in FIG. 10, after a reception of the handover message including an explicit MAC configuration, the terminal may start to synchronize with the target cell. Thereafter, the terminal may reset a medium access control (MAC) entity. Here, a time alignment timer (TAT) is also reset by the resetting of the MAC entity. Also, the terminal may re-establish a packet data convergence protocol (PDCP) entity and a radio link control (RLC) entity. After re-establishing the PDCP entity and the RLC entity, the terminal may apply new user equipment (UE) identity. Thereafter, the terminal may set or configure lower layers (L1/L2/L3) accordance with a radio resource control (RRC) configuration included in the handover message. In this step, the time alignment timer (TAT) is configured and the TAT may start to run. Thereafter, the terminal may configure a security and a measurement, and then may try to access into the target cell (i.e., transmitting a handover complete message) by means of a random access procedure. Here, the transmission of the handover complete message may be successfully performed because such transmission is granted by the MAC configuration due to the running TAT.

Figure 11:
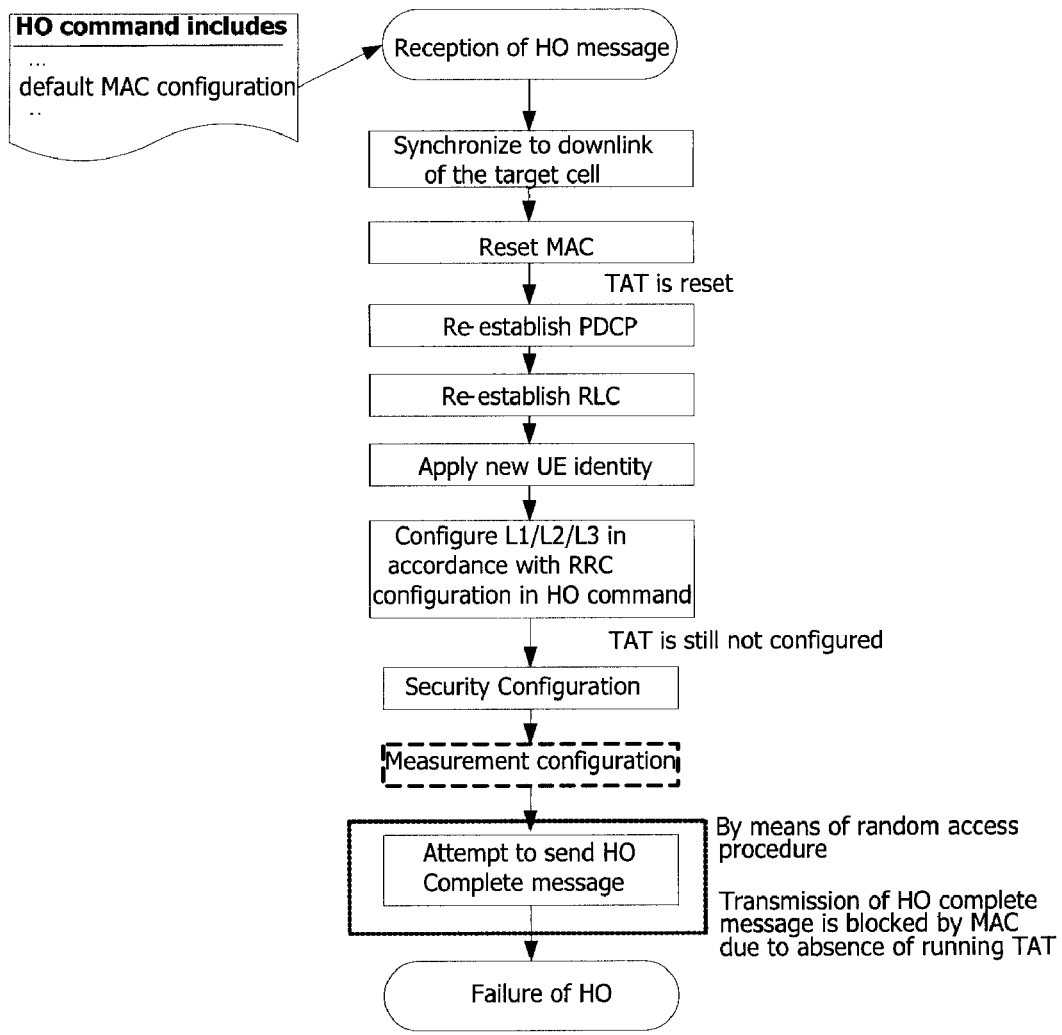
FIG. 11 is an exemplary view illustrating a handover procedure after a terminal receives a handover message including a default MAC configuration.

FIG. 11 is an exemplary view illustrating a handover procedure after a terminal receives a handover message including a default MAC configuration.

As illustrated in FIG. 11, after a reception of the handover message including a default MAC configuration, the terminal may start to synchronize with the target cell. Thereafter, the terminal may reset a medium access control (MAC) entity. Here, as the default MAC configuration does not include a TAT value, the TAT is not running. Thereafter, the terminal may re-establish a packet data convergence protocol (PDCP) entity and a radio link control (RLC) entity. After re-establishing the PDCP entity and the RLC entity, the terminal may apply new user equipment (UE) identity. Thereafter, the terminal may set or configure lower layers (L1/L2/L3) accordance with a radio resource control (RRC) configuration included in the handover message. Here, the time alignment timer (TAT) is still not configured and the TAT still does not start to run. Thereafter, the terminal may configure a security and a measurement, and then may try to access into the target cell (i.e., transmitting a handover complete message) by means of a random access procedure. However, in this case, the transmission of the handover complete message may not be successfully performed because such transmission is blocked by the MAC configuration (i.e., a default MAC configuration) due to an absence of the running TAT. Accordingly, due to the unsuccessful uplink transmission (i.e. a failure of the random access procedure), the handover procedure become a failure. As such, if the default MAC configuration is included in the handover command, the uplink transmission in the target cell can not be possibly performed due to the absence of the running TAT in the target cell, thereby causing the handover failure.

Accordingly, in the present invention, if the terminal is instructed to use a default MAC configuration during the handover procedure, the terminal may perform the handover procedure after acquiring a TAT value, which will be used in the target cell, through additional process, such that the handover procedure can be performed successfully. Here, the additional process may refer to the step of obtaining the TAT value from the broadcast information from the target cell. Further, the additional process may refer to the step of obtaining the TAT value from the received handover command. That is, the additional information for the TAT value may be included in the handover command.

Figure 12:
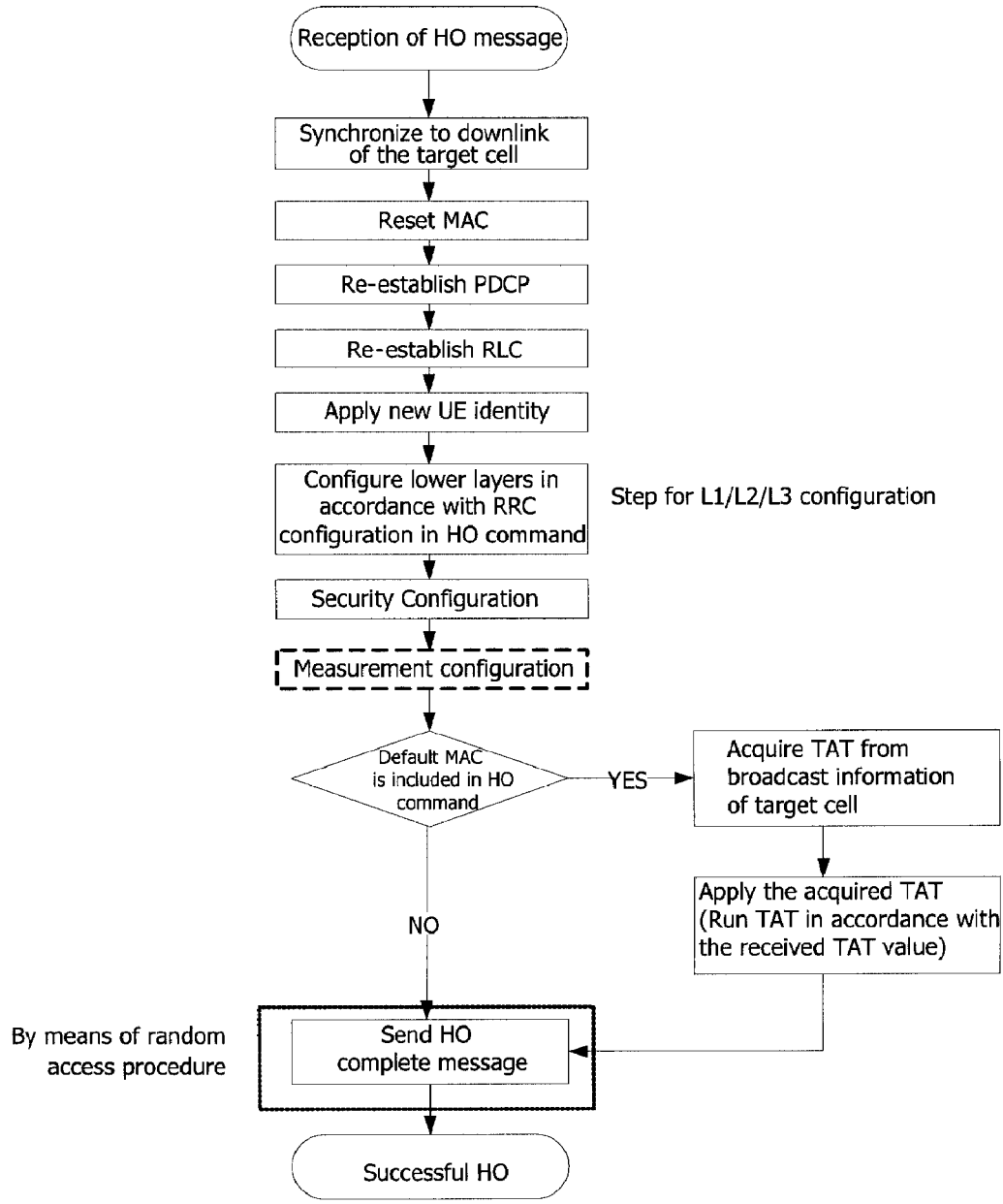
FIG. 12 is a first exemplary embodiment illustrating a handover procedure by means of random access procedure after obtaining a time alignment timer (TAT) value from system information of a target cell according to the present invention.

FIG. 12 is a first exemplary embodiment illustrating a handover procedure by means of random access procedure after obtaining a time alignment timer (TAT) value from system information of a target cell according to the present invention.

As illustrated in FIG. 12, after a reception of the handover message, the terminal may start to synchronize with the target cell. Thereafter, the terminal may reset a medium access control (MAC) entity. Thereafter, the terminal may re-establish a packet data convergence protocol (PDCP) entity and a radio link control (RLC) entity. After reestablishing the PDCP entity and the RLC entity, the terminal may apply new user equipment (UE) identity. Thereafter, the terminal may set or configure lower layers (L1/L2/L3) accordance with a radio resource control (RRC) configuration included in the handover message. Thereafter, the terminal may configure a security and a measurement. Thereafter, before performing a random access procedure for the handover in the target cell, the terminal may determine whether a default MAC configuration is included in the handover message (or handover command). If the handover command includes the default MAC configuration, the terminal may obtain a TAT value from broadcast information of the target cell. Thereafter, the terminal may start to run the TAT in accordance with the obtained TAT value. If the handover command does not include the default MAC configuration, the terminal may identify that an explicit MAC configuration has been used and may notice that the TAT is running at the step of the lower layers configuration. Since the running of the TAT is guaranteed or confirmed, the terminal may transmit a handover complete message to the target cell by means of the random access procedure.

Figure 13:
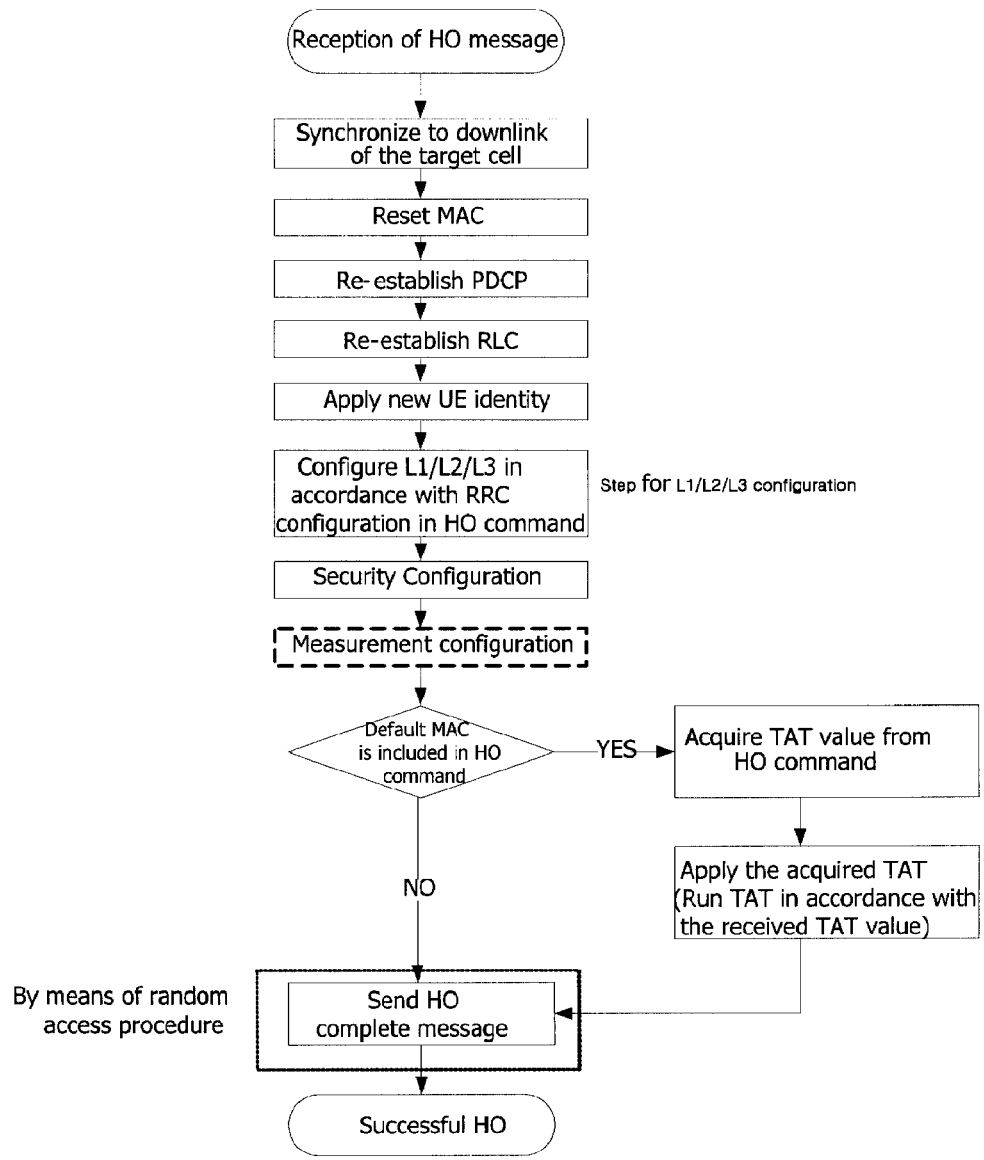
FIG. 13 is a second exemplary embodiment illustrating a handover procedure by means of random access procedure after obtaining additional TAT value from the handover message according to the present invention.

FIG. 13 is a second exemplary embodiment illustrating a handover procedure by means of random access procedure after obtaining additional TAT value from the handover message according to the present invention.

As illustrated in FIG. 13, after a reception of the handover message, the terminal may start to synchronize with the target cell. Thereafter, the terminal may reset a medium access control (MAC) entity. Thereafter, the terminal may re-establish a packet data convergence protocol (PDCP) entity and a radio link control (RLC) entity. After reestablishing the PDCP entity and the RLC entity, the terminal may apply new user equipment (UE) identity. Thereafter, the terminal may set or configure lower layers (L1/L2/L3) accordance with a radio resource control (RRC) configuration included in the handover message. Thereafter, the terminal may configure a security and a measurement. Thereafter, before performing a random access procedure for the handover in the target cell, the terminal may determine whether a default MAC configuration is included in the handover message (or handover command). If the handover command includes the default MAC configuration, the terminal may read a TAT value, which was additionally included in the handover message. Thereafter, the terminal may start to run the TAT in accordance with the obtained TAT value. If the handover command does not include the default MAC configuration, the terminal may identify that an explicit MAC configuration has been used and may notice that the TAT is running at the step of the lower layers configuration. Since the running of the TAT is guaranteed or confirmed, the terminal may transmit a handover complete message to the target cell by means of the random access procedure.

The present invention may provide a method of performing a handover procedure in wireless communications system, the method comprising: receiving a handover command from a network; determining whether a default Medium Access Control (MAC) configuration is included in the received the handover command; receiving an additional information from network if it is determined that the default MAC configuration is included; and performing the handover procedure with the network using the additional information received from the network, wherein the default MAC configuration is a predetermined value set between a terminal and the network, the additional information is a time alignment timer (TAT) value, the additional information is included in the received handover command, the TAT value is obtained from broadcast information transmitting from the network, the broadcasting information is transmitted from a target base station or a target cell, and the received handover command includes at least one of a target cell identification, target cell access information, a security configuration, and a measurement configuration.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of performing a handover procedure in a wireless communications system, the method comprising:
receiving a handover command from a network;
determining whether a default Medium Access Control (MAC) configuration is included in the received handover command, wherein the default MAC configuration is different from an explicit MAC configuration and is a predetermined value set between a terminal and the network;
receiving a timer alignment timer (TAT) value from the network when it is determined that the default MAC configuration is included; and
performing the handover procedure with the network using the default MAC configuration and the received TAT value.

2. The method of claim 1, wherein the TAT value is included in the received handover command.

3. The method of claim 1, wherein the TAT value is obtained from broadcast information received from the network.

4. The method of claim 3, wherein the broadcast information is received from a target base station or a target cell.

5. The method of claim 1, wherein the received handover command includes at least a target cell identification, target cell access information, a security configuration, or a measurement configuration.

* * * * *